Figure 1:
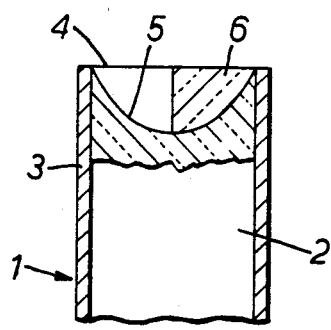

United States Patent [19]
Stewart

[11] 4,159,863
[45] Jul. 3, 1979

[54] COUPLING OF OPTICAL GLASS FIBRES

[75] Inventor: William J. Stewart, Towcester, England

[73] Assignee: Plessey Handel und Investments A.G., Zug, Switzerland

[21] Appl. No.: 841,381

[22] Filed: Oct. 12, 1977

[30] Foreign Application Priority Data

Oct. 13, 1976 [GB] United Kingdom ............... 42483/76

[51] Int. Cl.² ................................................ G02B 5/14
[52] U.S. Cl. ..................................... 350/96.18; 65/31
[58] Field of Search .......................... 65/37, 31, 38, 39; 350/96.18

[56] References Cited

U.S. PATENT DOCUMENTS

| | | | |
|---|---|---|---|
| 3,492,058 | 1/1970 | Waldman | 350/96.18 |
| 3,910,677 | 10/1975 | Becker et al. | 350/96.18 |
| 3,932,184 | 1/1976 | Cohen et al. | 350/96.18 |
| 4,049,413 | 9/1977 | French | 65/31 |
| 4,067,937 | 1/1978 | Unno et al. | 65/37 |

*Primary Examiner*—John K. Corbin
*Assistant Examiner*—Stewart Levy
*Attorney, Agent, or Firm*—Fleit & Jacobson

[57] ABSTRACT

The end of a glass fibre of the graded or at least stepped, index type, or in the case of a clad fibre, the end of its core, is etched with an etchant which varies in etching power according to the composition, and thus in a graded or stepped - index fibre according to the index, of the fibre - core material, thereby producing at the end of the fibre a recess or "well" whose depth increases from the edge towards the axis of the fibre.

7 Claims, 2 Drawing Figures

U.S. Patent  Jul. 3, 1979  4,159,863

COUPLING OF OPTICAL GLASS FIBRES

This invention relates to optical glass fibres and has for an object to provide a novel method of treating an end of an optical glass fibre with a view to facilitating the establishment of a good-efficiency optical coupling of said fibre end to a small-dimension source or receiver of light, for example to a light-emissive diode.

According to the invention, the end of a glass fibre of the graded-, or at least stepped-, index type, or in the case of a clad fibre, the end of its core, is etched with an etchant which varies in etching power according to the composition, and thus in a graded-or stepped- index fibre according to the index, of the fibre-core material, thereby producing at the end of the fibre a recess or 'well' whose depth increases from the edge towards the axis of the fibre. In one form of the invention the fibre is made of glass having a high melting point, with approximately parabolic grading of the index, and a predetermined small quantity of a readily fusible glass, which will melt at a substantially lower temperature than the glass constituting the fibre, for example of a chalcogenide, is placed in the well while the fibre is held in a vertical disposition, and the end of the fibre with the fusible glass in the well is then heated. When the fusible glass becomes liquefied, it will wet the material of the fibre and take up the shape of the fibre end, or form a somewhat convex surface determined by surface tension, and will thereby form a good-quality lens, which enables the fibre end to be optically coupled with good efficiency, for example to a small source of light such as a light-emissive diode.

The fibre, or the fibre core in the case of a clad fibre, which is to be subjected to the treatment according to the invention, may be made of doped silica by chemical vapour deposition, and buffered hydrofluoric acid has been found to be a suitable etchant for most fibres thus produced. The depth of etching may be varied according to requirements; a depth of 50 micron has been found useful in fibres of about 120 micron diameter.

A glass fibre formed with a concentric well in its end face constitutes another aspect of the invention, and apart from its use for the production of a fibre end having a quasi-integral lens formed at the end of the fibre by the method above explained, it may alternatively be used to receive a preformed lens, preferably a sphare lens, which is located in the well and secured in position by a suitable cementing material, for example by means of a clear epoxy adhesive, or by the use of a chalcogenide or other low-melting glass as a gluing medium, and it will be readily appreciated that if the well is only used to locate a preformed lens, a step-index fibre could be used instead of a fibre with approximately parabolic index grading.

Figure 2:
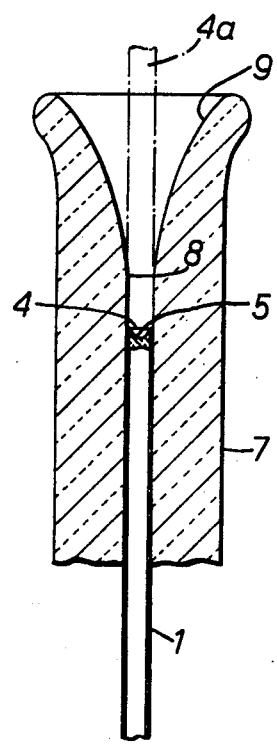

In the accompanying drawing:

FIG. 1 shows, partly in an axial section, a greatly enlarged end of a clad glass fibre in the end face of which a well of substantially parabolic profile has been produced, and part of a quasi-integral lens, formed therein, and FIG. 2 is an axial section, to a less enlarged scale, of a jig which may be used in the process of forming a quasi-integral lens in such recess.

Referring now first to FIG. 1, a clad fibre 1, having a core 2 of graded-index fibre with approximately parabolic grading, which is surrounded by suitable cladding 3, has been cut to make a good end 4. That end has been etched with an etchant that selectively etches the core material according to its composition, which itself varies according to the index, and as a result a well 5 of parabolic profile has been formed in the end face of the core 2. In this well a quasi-integral lens 6 has then been formed by introducing into the well, while the fibre is held vertically with its etched surface at the top, a quantity of a chalcogenide which will, when liquefied, just fill the well 5, and then applying heat to the end of the fibre to raise the temperature of the chalcogenide to a point at which this material will fuse to wet the glass of the fibre at the surface 5 and to take-up the shape of the end 4. If a lens with a convex outer surface is desired, this can readily be obtained by correspondingly increasing the quantity of chalcogenide introduced into the well. This introduction is conveniently effected with the use of a bead made of the requisite quantity of chalcogenide.

FIG. 2 illustrates a jig which greatly facilitates the introduction of the chalcogenide or other fusible glass intended for the formation of a lens, or of a preformed lens, into the well at the end of an optic glass fibre. The jig consists of a capillary tube 7 having a bore 8 of a diameter in which the fibre 1 is a loose fit. The bore is widened cut progressively at one end as shown at 9. Conveniently the capillary is made of glass, and the widening at 9 is effected in a well-known manner by a blowing technique.

In use the jig is held in an upright, vertical position as shown in FIG. 2, and the prepared filament 1 is threaded through the bore 8 from the bottom end of the jig and then withdrawn to the illustrated position, in which the end 4 of the fibre is just below the beginning of the widening portion 9. The fusible glass for forming a lens, preferably in the form of a bead, or a preformed sphere lens intended to be attached to the fibre, can then be simply dropped into the upper, widened end of the portion 9, and will be guided by the latter to engage the well 5 of the fibre.

In the case in which fusible glass has been inserted for the formation of a lens, the fibre is then pushed upwards to project from the upper end of the jig, and the end of the fibre 1 with the material located in the well 5 is fired in a furnace to melt the fusible glass, thereby forming the lens. Preferably a furnace is used into which the fibre may be pushed up vertically through a suitable bottom opening.

In the case of the introduction of a preformed lens, a spheric lens in the shape of a complete sphere offers the advantage that no problems of achieving a predetermined angular disposition can arise. Preferably a small quantity of 'gluing' material, for example of chalcogenide, or of a heat, fusible, heat-hardening resin material is introduced into the well 5 before the introduction of the sphere lens, and the thus loaded fibre end is, then, similarly as in the case of the formation of a chalcogenide lens, pushed upwardly through the upper end of the jig into a furnace to fuse the chalcogenide or to fuse and then cure the resin material, the furnace temperature being chosen according to the temperature required for the intended operation.

A glass fibre having an end equipped with a lens adherently engaging the surface of a suitably profiled well in the fibre end face, and a glass fibre equipped with a lens, preferably a sphere-shaped lens, located and secured in a well at an end of the fibre, constitute further aspects of the invention.

According to a modification of the method described for forming in the well of the fibre a lens having a free outer surface, a heat-resistant light-emissive device may be 'glued' to the fibre by the body of fused glass formed in the suitably profiled well.

What is claimed is:

1. An optical fibre and lens arrangement comprising an optical fibre having a chemically etched well formed in an end thereof, said well being provided with an optical lens, said optical lens having a convex surface, said convex surface being in intimate contact with the entire surface of said well.

2. An optical fibre and lens arrangement as claimed in claim 1 in which said lens is formed quasi-integrally with said fibre by melting a bead of relatively low melting point glass in said well.

3. An optical fibre and lens arrangement as claimed in claim 1 in which said lens is a separate spherical lens having its surface secured to said surface of said well by a suitable cementing material.

4. An optical fibre and lens arrangement as claimed in claim 1 in which said optical fibre has a stepped or graded index and in which the light transmissive portion of said fibre is etched with an etchant which varies in etching power according to the composition of said light transmissive portion of said fibre, thereby producing at the end of said fibre said well whose depth increases from the edge towards the axis of said fibre.

5. An optical fibre and lens arrangement as claimed in claim 4 in which said light transmissive portion of said fibre is of silica doped by chemical vapour deposition to produce the desired graded or stepped index and in which said etchant is a buffered hydrofluoric acid.

6. An optical fiber and lens arrangement as claimed in claim 4 in which said light transmissive portion of said optical fibre is formed of a glass having a relatively high melting point and a substantially parabolic grading of its index.

7. An optical fibre and lens arrangement as claimed in claim 6 wherein said lens is formed of molten readily fusible glass of a relatively low melting point which has been introduced into said well of a vertically arranged fibre.